Jan. 16, 1968  R. E. CAMPBELL  3,364,289

METHOD OF MANUFACTURING PLASTIC MONOFILAMENT STRUCTURES

Filed Oct. 28, 1964  3 Sheets-Sheet 1

Jan. 16, 1968    R. E. CAMPBELL    3,364,289
METHOD OF MANUFACTURING PLASTIC MONOFILAMENT STRUCTURES
Filed Oct. 28, 1964    3 Sheets-Sheet 2

Jan. 16, 1968    R. E. CAMPBELL    3,364,289
METHOD OF MANUFACTURING PLASTIC MONOFILAMENT STRUCTURES
Filed Oct. 28, 1964    3 Sheets-Sheet 3

Inventor
Robert Edward Campbell
By Brown Jackson Boettcher +
Dienner Attys.

3,364,289
METHOD OF MANUFACTURING PLASTIC
MONOFILAMENT STRUCTURES
Robert Edward Campbell, Doncaster, England, assignor to British Ropes Limited, Doncaster, England, a British company
Filed Oct. 28, 1964, Ser. No. 410,044
7 Claims. (Cl. 264—103)

This invention relates to a method of forming plastic monofilament structures such as strands, ropes or cores of any diameter or generic construction, produced from monofilaments of any plastic materials which are capable of molecular orientation when stretched. The foregoing statement is applicable to a single plastic material or a combination of two or more such materials.

A strand or core in this connection consists of three or more monofilaments helically twisted together. A rope consists of three or more of such strands helically twisted together or helically twisted around a core. A core can consist of a single strand, or three or more strands helically twisted together to form a unit over which the rope proper is formed. The core strands are not necessarily made from the same material as the overlying rope strands. For example, the core strands of a steel rope may be made according to the invention.

The preferred materials are monofilaments of "nylon," "terylene" and polypropylene, which have been partially or fully orientated by passing through a "godet" system or some such device.

Fully or partially orientated plastic monofilaments, when spun or twisted together to form—for example—a strand, exhibit a marked propensity to unlay and, when subjected to bending, the individual outer filaments tend to move out of their intended position, and hence permit the protrusion or looping of the filaments from the underlying positions. Furthermore, when subjected to a tensile load such a strand exhibits a pronounced reduction in diameter. These and other similar features can severely limit the application of plastic monofilament cores to wire ropes.

Existent production methods have failed to completely satisfy rope making requirements, especially in the case of rope cores, where maximum resistance to compression and minimum reduction in diameter due to tensile loading, are essential.

The invention consists of a method of producing compacted strand, rope or core made of plastic monofilaments which are capable of molecular re-orientation when heated and stressed, in which the formed strand, rope or core is subjected to axial tension, radial compression and heat whereby to compact the cross sections of the monofilaments comprising the strand, rope or core into symmetrically interfitting geometric shapes. Preferably the heating is sufficient to raise the monofilaments to their softening points.

By this means, the above detrimental features of existing production methods are overcome and full advantage is taken of other desirable features possessed by a number of elastomers, i.e. chemical stability, resistance to absorption of water and immunity to biological attack.

It was found that these desirable attributes could be enhanced because further orientation is initiated, together with heat compaction, when the selected number of monofilaments in their initial prescribed geometrical configuration are passed through the reducing means.

The compaction process can be effected in one or more stages. Where multistage processing is employed, it is preferred that the first stage comprises a forming and sizing operation without appreciable reduction of cross sectional area of the monofilaments in which the monofilaments are restrained in a precise and predetermined position by the combined effects of twisting, radial pressure, and heat; the latter preferably sufficient to cause the filaments to assume a partially softened state. For the second and subsequent stages the strand, rope or core is maintained at a temperature preferably at or near to the softening temperature of the material, whilst it is subjected to radial compression sufficient to reduce the cross sectional area of the strand, rope or core.

The temperature of the strand, rope or core is maintained between the reduction operations by a convenient method, e.g. by circulating hot lubricating fluid around it.

Preferably the first stage of the process is effected at the forming point, i.e. the point at which the plastic monofilaments are twisted together to form the strand or core, or at which the strands are twisted together to form the rope.

Preferably the strand, rope or core is lubricated while being formed and the temperature is conveniently maintained between the compression operations by means of a flow of heated lubricant.

The invention is also applicable to strands, ropes or cores composed of a mixture of orientated elastomers, and an elastomer possessing a low coefficient of friction.

For example, a strand may be twisted from alternate monofilaments of "nylon" and polythene, and processed as described according to the invention. Such a strand, rope or core, when subjected to flexion will have improved flexibility, buoyancy, and will be largely self-lubricating when subjected to flexion under tension in dry conditions.

The invention further consists of strands, ropes or cores of plastic monofilaments when prepared by the above method. In general the filament cross sections in these will have a regular geometric configuration.

The invention will be further described with reference to the accompanying drawings.

Figure 5:
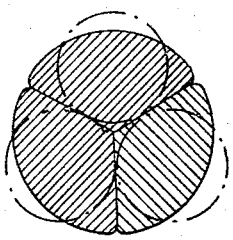
Figure 6:
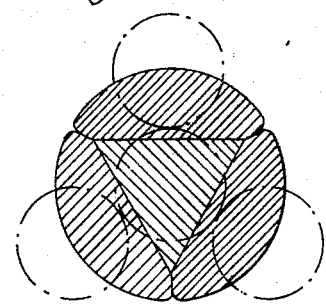
Figure 8:
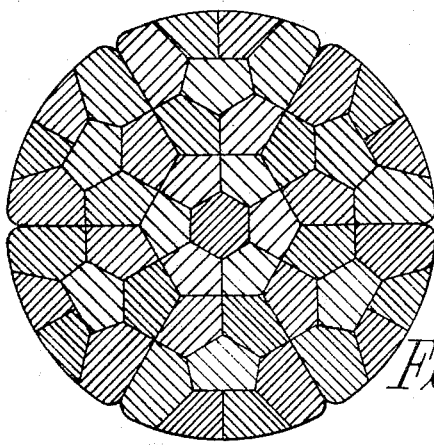
Figure 7:
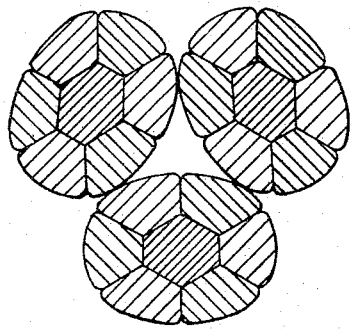

FIGURES 3 to 6 inclusive are sections of various forms of strand compacted according to the invention; and FIGURES 7 and 8 are cross sections of forms of rope compacted according to the invention.

For simplicity, a design of strander in common use, namely—a tubular stranding machine—will be described to illustrate how the invention functions.

The requisite size of monofilaments are wound onto bobbins 1. These monofilaments may be all of the same diameter, or of selected diverse diameters, according to the generic classification of strand construction which is being produced. The bobbins wound with monofilaments are inserted into cradles 2, located along the central axis of a steel tube 3; this tube is fitted with a power drive 4 via a gear train 5 capable of making it rotate in either a clockwise or anti-clockwise direction at a given speed, the said speed being variable at will over a wide range. The cradles holding the bobbins are, in turn, located into a gyrating system within the tube, so that the bobbins remain stationary and merely rotate around their centres in order to permit the filament, with which they are loaded, to pay off.

The requisite number of monofilaments are passed along the length of the tube via fairleads, and finally through a lay plate 6 which holds them in the desired position whilst they proceed through the forming point.

For preference it is at the forming point and subsequent stations on the machine that the invention is applied.

At the forming point proper, the nips or split die are replaced by an annular die or similar device 7, this may be of hardened and polished steel, tungsten carbide or ceramic which, as an integral part, is provided with a means of heating 8, preferentially by electricity, permitting it to be raised to a temperature in excess of the softening point of the specific elastomer being processed.

The temperature at which the die requires to be maintained will, largely, be influenced by the diameter of the strand, rope or core, the speed at which it traverses through the die, the consequent mass of material being processed and the physio-chemical properties of the material. These factors must be taken into account in order to bring the temperature of the elastomer into a close proximity of the desired processing temperature. For example, during the treatment of a strand of diameter 0.102" incorporating 7 (seven) "Perlon 6" monofilaments, the production speed being maintained constant at 30 ft./min., the preferred operating temperature for the die is 180° C., the softening temperature of the "Perlon 6" monofilaments being 170° C.

Furthermore, it should be noted that the aperture of the die at the forming point is preferentially equal to or at most only 10% less than the calculated area, based on the diameter of the strand of the given construction, composed of round monofilaments, and possessing the maximum fill factor space; that is the die is primarily required to function as a sizing die, rather than a reducing means, at the forming point.

Situated at a distance of some 6" to 18" but preferentially 12" behind the first die, a further die 9 is incorporated into the system. This die again includes facilities for heating 10, and differs from the first die only in respect of the diameter of the bore. The bore diameter in this case is that required to give between 20% and 50% reduction in cross sectional area when compared with the first die. There requisite bore diameter is controlled primarily by calculating the size of strand it is desired to make and in which there is no fill factor space.

It is emphasized that this second die is the one which effects the major compacting and deformation of the multiplicity of monofils to their desired shape and physical characteristics.

Should further compaction of the strand be necessary, a third and fourth die can be employed subsequent to the second die. The bore diameters of the additional dies are such as to give between 30% and 80% less cross sectional area than that of the first sizing die.

The reduction of cross-sectional area is based on the initial diameter of the strand, rope or core composed of round monofilaments. Subsequent deformation of the initially round monofilaments effects a reduction in the internal fill factor space of the strand, rope or core; this reduction in area being markedly greater than any such reduction in the individual monofils.

Expressed in an alternative manner, the reduction of cross-sectional area based upon diameter measurements is effected by two separate mechanisms:

(i) Deformation of the individual monofilaments with consequent reduction of internal fill factor space.
(ii) Permanent elongation and orientation of the molecular structure in the monofils, with consequent reduction of their individual cross sectional area.

When the small percentage reductions are employed, mechanism (i) is primarily operative, but when the percentage reduction is increased to 30% or more of the initial strand area, the fill factor space is virtually non-existent and mechanism (ii) becomes fully operative.

Primary compacting and lubrication of the elastomer is materially assisted by the introduction, between the die stations, of a metal tube 11 fitted with a T junction. This is a thick walled tube, whose bore is 0.003" to 0.005" greater than the diameter of the strand passing through it. One end of the tube is flanged and secured to the face of the die in such a way that it effects a pressure tight seal; the orifice at the other end is left open to the atmosphere.

A suitable lubricant, e.g. glycerine and water, is freely circulated whilst hot, through the tube via the T junction, the surplus emerging from the open end of the tube and being recirculated via a feed tank 12 and centrifugal pump 13.

This device not only provides full lubrication at the zone of maximum deformation, but assists in maintaining and, if necessary, building up the initial heat provided by the first die. If the linear traverse of the strand is sufficiently fast, it promotes the building up of hydrostatic pressure which assists in applying uniform compacting and deformation of the monofils as they pass through the second and subsequent dies to assume their final and requisite geometric configuration.

It is envisaged that, in order to obtain heat transfer to the strand at several hundred feet per minute, a high frequency thermionic valve induction heater would be applied to the T tube. Such a unit would not heat the tube, but any organic material passing through it would heat very rapidly.

The internal lubrication of the strand is effected in the orthodox manner by a feed of lubricating compound at the forming point. It is preferred that this lubricant is heated to a temperature approximating to the requisite processing temperature of the monofilament, in order to assist in maintaining the requisite temperature throughout the operation.

The tractive effort necessary to draw the strand through the die system is obtained by means of a surge wheel 14 although in order to have precise control over the tractive force, and so maintain the desired speed of traverse, it is preferred to employ a system of tandem rollers in conjunction with the surge wheel.

The final stage of this invention is to pass the treated and compacted strand through an ageing bath 15 in which either water or an aqueous based lubricating medium is maintained at 80° C.–100° C. The effects induced during this final treatment are achieved by returning the monofilament material to the fully hydrated condition.

After this treatment the strand is spooled ready for use.

Whilst the application of the invention has been described employing a stranding machine with certain modifications, attention is drawn to the fact that the same method can be applied to an already formed strand, rope or core as a separate operation.

EXAMPLES (A) *Orthodox strand as formed, with no additional heat treatment.*

| | |
|---|---:|
| Type of monofilament | "Perlon 6" |
| Construction | 1 x 7(6/1) |
| Diameter of monofilaments _____in__ | 0.040 |
| Overall diameter of strand _____in__ | 0.120 |
| Breaking load of strand _____lb__ | 390–400 |
| Extension to fracture (10" gauge length) _____percent__ | [1]25 to 35 |
| Equivalent reduction in diameter ___do____ | 24 |
| Draft | Nil |

[1] Depending on strand lay.

(B) *Orthodox strand, heat compacted but not aged.*

| | |
|---|---:|
| Type of monofilament | "Perlon 6" |
| Construction | 1 x 7(6/1) |
| Original diameter of monofilaments _____in__ | 0.040 |
| Overall diameter of strand (after compacting) _____in__ | 0.102 |
| Drafting (cross sectional area) _____percent__ | 27.5 |
| Breaking load to strand _____lb__ | 390–400 |
| Extension to fracture (10" gauge length) _____percent__ | 17 |
| Equivalent reduction in diameter __do____ | 5 |

This example shows that the treatment has effected a marked improvement in the physical characteristics of the product when compared with the untreated strand. However, as a result of the fact that the material is considerably dehydrated during treatment, the desirable effects are transient. To overcome this feature the strand is subjected to ageing, the effects of which are shown in Example C.

(C) *Orthodox strand, heat compacted and aged.*

| | | |
|---|---|---|
| Type of monofilament | | "Perlon 6" |
| Construction | | 1 x 7(6/1) |
| Original diameter of monofialments | in | 0.040 |
| Overall diameter of strand (after compacting) | in | 0.102 |
| Drafting (cross sectional area) | percent | 27.5 |
| Breaking load of strand | lb | 390–400 |
| Extension to fracture (10" gauge length) | percent | 30 |
| Equivalent reduction in diameter | do | 8 |

The information provided in the foregoing tables was obtained from samples which were not lubricated when passing through the forming point, and the effect of applying hot lubricant to the die at the forming point is recorded as follows.

(D) *Orthodox strand with heated lubricant at both dies, compacted and aged.*

| | | |
|---|---|---|
| Type of monofilament | | "Perlon 6" |
| Construction | | 1 x 7(6/1) |
| Original diameter of monofilaments | in | 0.040 |
| Overall diameter of strand (after compacting) | in | 0.102 |
| Drafting (cross sectional area) | percent | 27.5 |
| Breaking load of strand | lb | 390–400 |
| Extension to fracture (10" gauge length) | percent | 25±3 |
| Equivalent reduction in diameter | do | 7±1 |

It was also established that whilst large drafting increases the density of the strand and consequently lessens the fill factor space, the tensile strength and other physical attributes are not adversely affected.

(E) *Orthodox strand with heated lubricant at both dies compacted at increased drafting and aged.*

| | | |
|---|---|---|
| Type of monofilament | | "Perlon 6" |
| Construction | | 1 x 7(6/1) |
| Original diameter of monofilaments | in | 0.040 |
| Overall diameter of strand (after compacting) | in | 0.095 |
| Drafting (cross sectional area) | percent | 40 |
| Breaking load of strand | lb | 390–400 |
| Extension to fracture (10" gauge length) | percent | 22 |
| Equivalent reduction in diameter | do | 7 |

The strand for the foregoing example was treated in a two die operation, the first die being a sizing die whilst all the compaction was achieved by the second die. The use of a third die, as a means of reducing the drafting at any one compacting stage effectively increases the strength of the strand, whilst largely maintaining the other desirable attributes of the two stage process.

(F) *Orthodox strand with heated lubricant employing three stage compaction followed by ageing.*

| | | |
|---|---|---|
| Type of monofilament | | "Perlon 6" |
| Construction | | 1 x 7(6/1) |
| Original diameter of monofilaments | in | 0.040 |
| Overall diameter of strand (after compacting) | in | 0.102 |
| Drafting (cross sectional area) | percent | [1]30 |
| Breaking load of strand | lb | 425–450 |
| Extension to fracture (10" gauge length) | percent | 25–30 |
| Equivalent reduction in diameter | do | 8–9 |

[1] Two stages each 15%.

By means of the invention described, a multiplicity of plastic monofilaments, when spun or twisted into a strand, rope or core, are given the following beneficial attributes:

(a) A minimum fill factor space with consequent increased resistance to compression.

(b) A truly interlocking geometric configuration.

(c) An increased resistance to malformation when subjected to bending or twisting. The individual monofilaments adopt a precise geometric form and, additionally, if the strand is cut they retain the helical position into which have been formed. This endows a core, or rope, formed from such strands with almost complete resistance to malformation when violently kinked or subjected to similar abuse.

(d) A setting of the lays or helix in the individual filaments and/or strands to produce in one and the same operation, characteristics comparable with post or pre-forming.

(e) A high resistance to compression which in turn ensures a less reduction in diameter when subjected to tensile loading.

(f) A small extension to fracture value.

(g) A retention, in the case of fully orientated plastics, of the initial breaking load for an increased length of strand and reduced cross sectional area of plastic material. With partially orientated monofilaments, the breaking load is increased.

(h) Due to further orientation in the course of applying the invention the rate of recovery, upon the application of a tensile load is improved by 20%.

Figure 1:
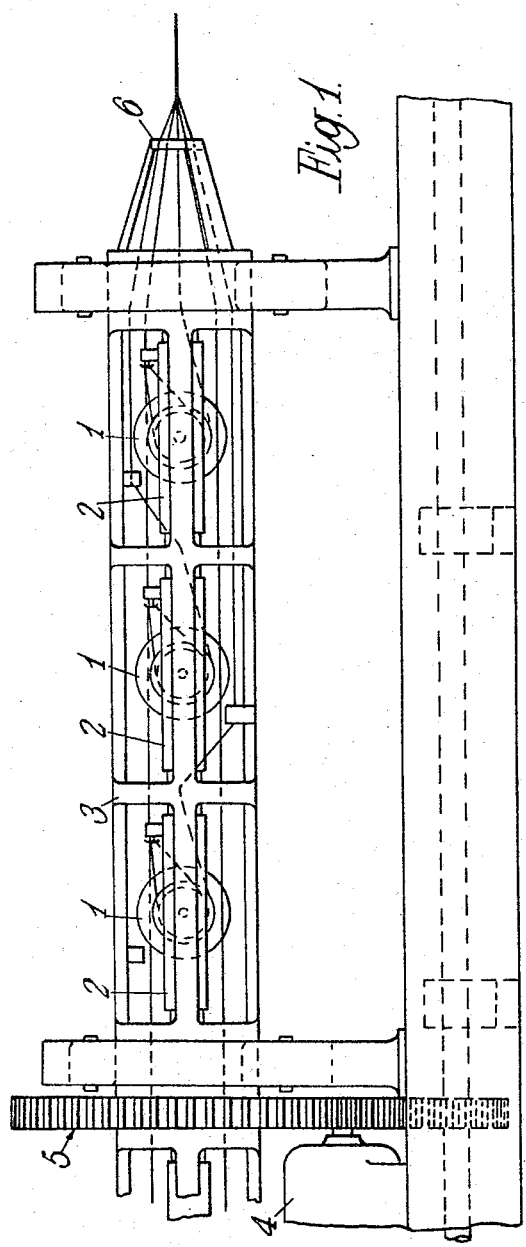
FIGURE 1 is an elevation of part of a stranding machine.
Figure 2:
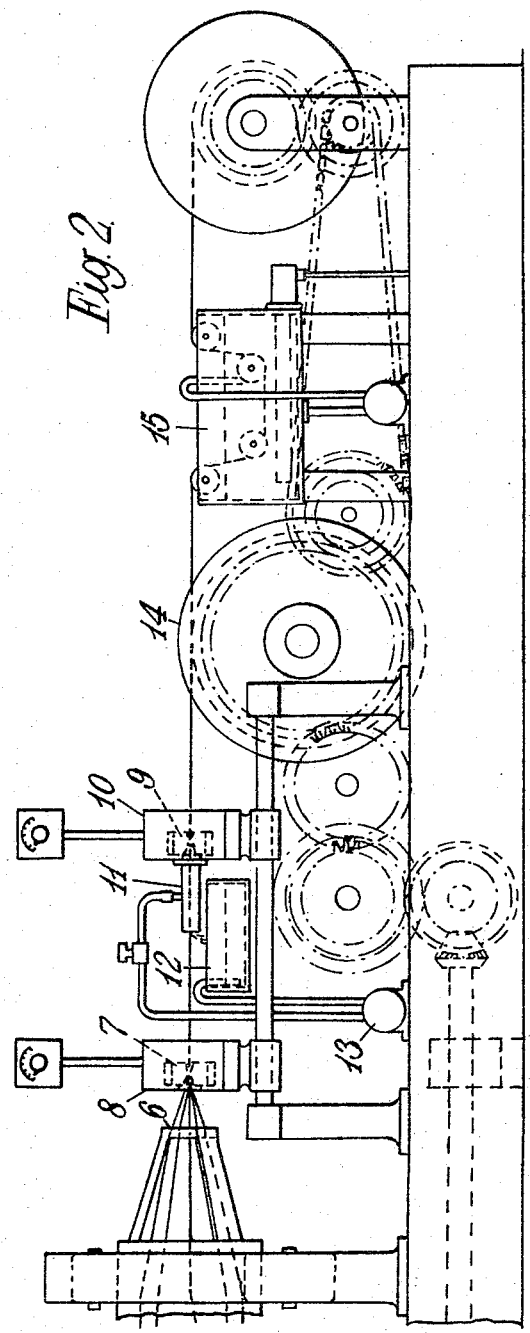
FIGURE 2 is an elevation of an extension of the stranding machine according to the invention.
Figure 3:
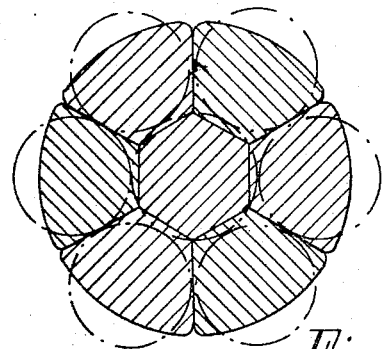

FIGURE 3 shows the strand construction employed for the examples cited, having one central monofilament surrounded by six similar monofilaments in the drawn state (indicated by the hatching) the original cross sections of the filaments being indicated by the broken lines.

Figure 4:
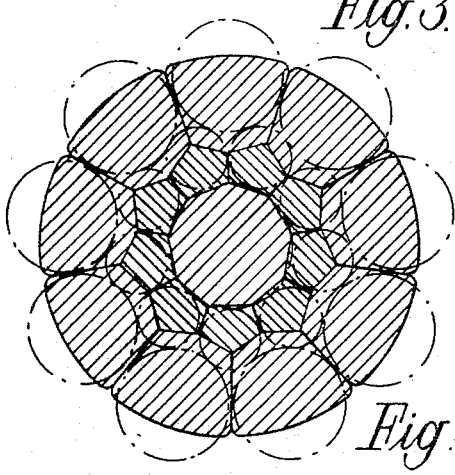

FIGURE 4 is a section of a 1 x 19(9/9/1) construction strand before and after subjecting to the same drawing treatment.

FIGURE 5 is a section of a simpler construction of three monofilaments twisted together and drawn according to the invention.

FIGURE 6 is a section showing the results of drawing a strand consisting of three monofilaments twisted around a central monofilament.

FIGURE 7 illustrates heat compacted strand according to FIGURE 3 spun into a three strand core, and then subjected to further heat compaction during the closing operation whilst employing 27½% reduction, i.e., partial compaction.

FIGURE 8 illustrates a fully compacted six strand rope containing a seven filament core. In this case the overlying strands and core strand were initially compacted as in FIGURE 3, then subjected to further heat compaction as an integral part of the closing operation.

Basically, the process can be applied in a variety of ways including the following:

(1) To produce a compacted strand which would subsequently be employed as a core strand.

(2) To produce a compacted strand, which would subsequently be spun into a multi-strand core.

(3) As (2) but the completed core would be subjected to further treatment by means of the invention.

(4) Compacted rope strands, closed over a core produced by any of the ways listed under (1), (2) or (3).

(5) As detailed in (4) but the completed rope would again be subjected to final compaction.

I claim:

1. A method of producing helically twisted plastic monofilament structures capable of reorientation, which comprises helically twisting the monofilaments, subjecting said helically twisted monofilaments to axial tension and radial compression while at the same time applying heat to the monofilaments to raise them to their softening point to thereby cause the filaments to compact and deform while undergoing orientation to produce a structure the cross section of which is composed of closely interfitting shapes forming a symmetrical geometric pattern free from internal voids, the compaction and deforming of the monofilaments being effected in at least two stages, the first stage of compaction being effected without appreciable reduction of the cross-sectional area of the monofilaments, and maintaining the heat applied to the monofilament structure between the reduction operations.

2. A method as claimed in claim 1, in which a second stage of compaction effects a reduction in cross sectional area of the monofilament structure of 20%–50%.

3. A method as claimed in claim 2, in which a third stage or subsequent stages of compaction effects or effect a reduction in cross sectional area of the monofilament structure of 30%–80% of the cross sectional areas produced by the first die.

4. A method as claimed in claim 1, in which a second and third stage of compaction each effects the same degree of reduction in cross sectional area of monofilaments.

5. A method as claimed in claim 4, in which the degree of reduction of cross sectional area of monofilaments for each of the second and third stages of compaction is 15%.

6. A method as claimed in claim 1, in which the temperature is maintained by circulating hot lubricating fluid around the monofilament structure.

7. A method as claimed in claim 1, in which the first stage of compaction is effected at the forming point of the monofilament structure.

References Cited

UNITED STATES PATENTS

| | | | |
|---|---|---|---|
| 2,353,270 | 7/1944 | Rugeley et al. | 264—290 X |
| 3,018,610 | 1/1962 | Kleinekahofer | 264—290 X |
| 3,048,963 | 8/1962 | Himmelfarb et al. | 57—157 X |

FOREIGN PATENTS 570,588    7/1945    Great Britain.

ROBERT F. WHITE, *Primary Examiner.*

T. J. CARVIS, *Assistant Examiner.*